United States Patent [19]

Ide et al.

[11] Patent Number: 4,719,519
[45] Date of Patent: Jan. 12, 1988

[54] COMPONENT VIDEO SIGNAL MAGNETIC RECORDING AND REPRODUCING APPARATUS INCLUDING MEANS FOR EXPANDING AND COMPRESSING LUMINANCE AND COLOR DIFFERENCE SIGNALS

[75] Inventors: Akifumi Ide, Kadoma; Chojuro Yamamitsu, Kawanishi, both of Japan

[73] Assignee: Matsushita Electric Industrial Co., Ltd., Osaka, Japan

[21] Appl. No.: 714,017

[22] Filed: Mar. 19, 1985

[51] Int. Cl.[4] ............................................... H04N 9/80
[52] U.S. Cl. ................................... 358/310; 358/320; 358/323
[58] Field of Search ............... 358/310, 320, 323, 330, 358/324, 12, 14, 15

[56] References Cited
U.S. PATENT DOCUMENTS
4,630,131 12/1986 Ichinoi et al. ..................... 358/310

*Primary Examiner*—Robert L. Richardson
*Attorney, Agent, or Firm*—Spencer & Frank

[57] ABSTRACT

A video signal recording and reproducing apparatus wherein in the recording mode, a luminance signal and a pair of color difference signals are divided into two groups each to be alloted for each horizontal scan period. The divided luminance signal is expanded along the time axis to such an extent as to exceed slightly the horizontal blanking period and the divided two color difference signals are compressed along the time axis. The time-processed luminance signal and two color difference signals are multiplexed in time division to produce two multiplexed signals lasting for two horizontal scan periods, which are separated, processed and recorded on separate tracks. In the reproducing mode signals reproduced from the two tracks are separately processed and restored into two multiplexed signals, the timing difference between the two multiplexed signals is corrected, the signals are then time reversely converted thereby to obtain a divided luminance signal and two divided color diffference signals, and these divided signals are multiplexed respectively and restored into a continuous luminance signal and a pair of color difference signals.

7 Claims, 17 Drawing Figures

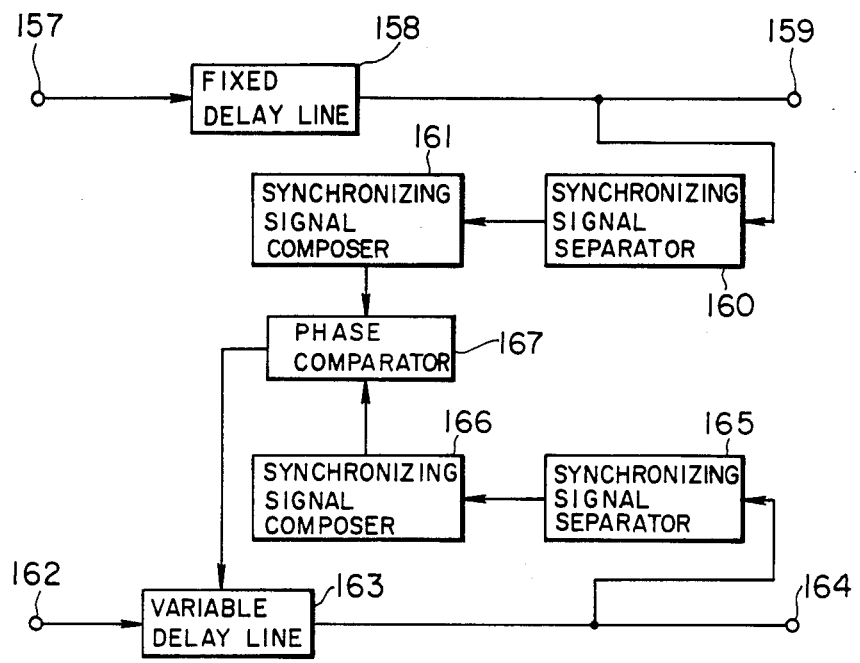
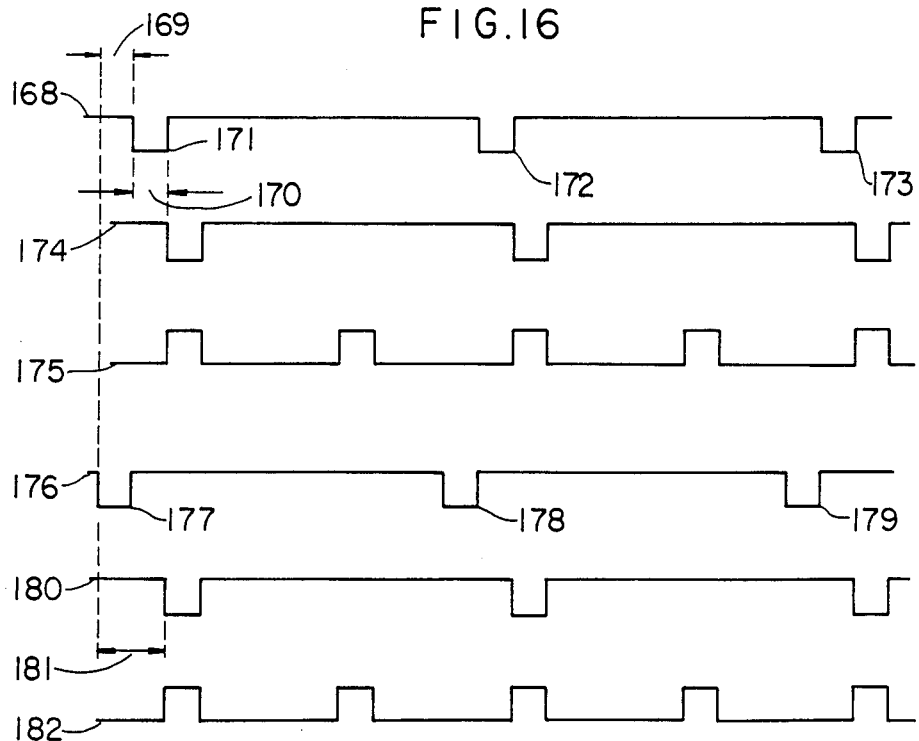

COMPONENT VIDEO SIGNAL MAGNETIC RECORDING AND REPRODUCING APPARATUS INCLUDING MEANS FOR EXPANDING AND COMPRESSING LUMINANCE AND COLOR DIFFERENCE SIGNALS

BACKGROUND OF THE INVENTION

1. Field of the Invention

The present invention relates to a video signal recording and reproducing apparatus, and in particular to a component video signal magnetic recording and reproducing apparatus of the baseband recording type with a plurality of channels.

2. Description of the Prior Art

Video signal recording and reproducing apparatuses that have been developed and find applications include a VTR (video tape recorder) with magnetic tape used as a recording medium and a video disc with a magnetic disk (or optical disk) used as a recording medium. Especially, the VTR technology has recently become so advanced that the ownership of VTR's for home-use has greatly expanded.

VTR's are roughly classified into direct recording system and color-under recording system. The former system directly uses the video signal (a composite signal with luminance signal and carrier chrominance signal multiplexed with each other) for FM modulation. In the latter method, on the other hand, the carrier chrominance signal and the luminance signal in the video signal are separated from each other, and the luminance signal alone is FM-modulated, while the carrier chrominance signal is frequency-converted to low frequency and multiplexed with the FM luminance signal for recording. Generally, the direct recording system is used for high-class VTR which can obtain a high-quality reproduced picture. Although it produces a high-quality picture, the device is bulky and tape consumption is great, thereby leading to a high cost. The color-under recording system, on the other hand, with compact hardware, is smaller in tape consumption and cost and therefore finds application mainly as a home-use VTR. Though natural, the picture quality of this color-under recording system is lower than the direct recording system.

In view of this situation, research is being conducted on various systems which are compact in hardware, low in cost and tape consumption and can produce a high-quality reproduced picture at the same time. One of them is a method in which the color difference signals are processed in the baseband state and split for recording by a couple of heads. The baseband processing eliminates the need for a time base corrector required for the direct recording system to correct the phase change of the chrominance subcarrier and prevents deterioration of the color information which otherwise might occur in the color-under recording system.

If the recording system is to be configured of small hardware, the diameter of the head cylinder must be reduced. In the case of a small head cylinder, however, the frequency band width for recording and reproducing is limited, so that it becomes difficult to record and reproduce the luminance signal and the two color difference signals in a single track. For this reason, they are recorded and reproduced in two tracks.

The system will be explained with reference to FIG. 1 as a conventional example capable of recording and reproducing a high-quality picture with small hardware and comparatively small tape consumption. FIG. 1 is a block diagram of a VTR of the baseband-processed two-channel recording type mentioned above. In FIG. 1, reference numeral 1 designates an input terminal, numeral 2 a decoder, numeral 3 a luminance signal, numeral 7 an (R-Y) signal, numeral 8 a (B-Y) signal, numeral 4 a luminance signal recording processor (designated as "Y-PROC" in FIG. 1), numeral 5 an FM modulator, numeral 9 a multiplexer, numeral 10 a color difference signal recording processor (designated as "C-PROC" in FIG. 1), numeral 11 an FM modulator, numerals 6 and 12 recording heads, numeral 13 a magnetic tape, numerals 14 and 18 playback heads, numeral 15 an FM demodulator, numeral 16 a luminance playback processor (designated as "Y-PROC" in FIG. 1), numeral 17 a luminance signal, numeral 19 an FM demodulator, numeral 20 a color difference signal reproducing processor (designated as "C-PROC" in FIG. 1), numeral 21 a demultiplexer, numeral 22 an (R-Y) signal, numeral 23 a (B-Y) signal, numeral 24 an encoder and numeral 25 an output terminal.

The video signal to be recorded is applied through the input terminal 1 to the decoder 2. The decoder 2 decodes the applied video signal into the luminance signal 3, (R-Y) signal 7 and (B-Y) signal 8. The two color difference color-difference signals handled are assumed to be the (R-Y) signal and the (B-Y) signal.) The luminance signal picked up at the decoder 2 is applied to the luminance signal recording processor 4. The luminance signal recording processor 4, having pre-emphasis, clip and clamp processes, applies an output to the FM modulator 5 for FM modulation, after which the signal is recorded in the magnetic tape 13 through the recording head 6. The two color difference signals including (R-Y) signal 7 and (B-Y) signal 8 picked up at the decoder 2, on the other hand, are both applied to the multiplexer 9. The (R-Y) signal 7 and the (B-Y) signal 8 applied to the multiplexer 9 are multiplexed by time division multiplex (for example, the (R-Y) signal 7 and the (B-Y) signal 8 are compressed to half along the time axis and multiplexed in series.), and after that, supplied to the color difference recording processor 10. The color-difference recording processor 10, having such processes as pre-emphasis, clip and clamp, applies the signal to the FM modulator 11, after which the signal is recorded on the magnetic tape 13 through the recording head 12.

In playback mode, the information corresponding to the luminance signal recorded on the magnetic tape 13 is picked up through the playback head 14 and demodulated by the FM demodulator 15. The demodulated signal is de-emphasized or clamped at the luminance playback processor 16, and then applied as the luminance signal 17 to the encoder 24. On the other hand, the information corresponding to the color difference signal recorded on the magnetic tape 13 is picked up through the playback head 18 and demodulated by the FM demodulator 19. The demodulated signal, after being de-emphasized or clamped at the color difference playback processor 20, is applied to the demultiplexer 21. The demultiplexer 21 converts the multiplexed signals back to an (R-Y) signal and a (B-Y) signal in the normal time axis, and after that, the resulting (R-Y) signal 22 and the (B-Y) signal 23 are applied to the encoder 24. The encoder 24 produces a composite video signal on the basis of the luminance signal 17, (R-Y) signal 22 and the (B-Y) signal 23 and supplies a reproduced video signal through the output terminal 25.

The conditions of respective parts are shown in FIG. 2. In FIG. 2 showing waveforms produced at the parts included in FIG. 1, numeral 26 designates a luminance signal waveform, numeral 27 an (R-Y) signal waveform, numeral 28 a (B-Y) signal waveform, numeral 29 a multiplexed color difference signal waveform, numeral 30 a horizontal scan period, numeral 31 a horizontal synchronization signal, numeral 33 a time-axis-compressed (R-Y) signal, numeral 34 a time-axis compressed (B-Y) signal and numeral 32 a color difference synchronization signal. In FIG. 1, the luminance signal 3, (R-Y) signal 7 and (B-Y) signal 8 correspond to the waveform 26, waveform 27 and waveform 28 respectively, while the output of the multiplexer 9 corresponds to the waveform 29. In the absence of deterioration in recording and playback, the luminance signal 17, (R-Y) signal 22 and the (B-Y) signal 23 of course correspond to the waveforms 26, 27 and 28 respectively, and the signal applied to the demultiplexer 21 to the waveform 29.

The information frequency band of the prior art mentioned above will be discussed below.

Generally, if a high-quality reproduced picture is to be obtained, the luminance signal 3 requires a frequency band of about 4 MHz, the (R-Y) signal 7 and the (B-Y) signal 8 about 1.3 MHz respectively. Then, the bandwidth of the signal applied to the FM modulator 5 is about 4 MHz. On the other hand, since the color difference signals are multiplexed by being compressed half in time, the signal bandwidth applied to the FM modulator 11 is about 2.6 MHz (1.3 MHz×2). If the magnetic heads and magnetic tape are considered to be a transmission path, the transmission bandwidth of this transmission path is determined substantially by the minimum wavelength and relative speeds of the magnetic heads and magnetic tape capable of recording and reproduction. In the conventional system shown in FIG. 1, the luminance signal and the color difference signals of course are recorded at the same relative speeds, and therefore they have substantially the same frequency bandwidth to be recorded and reproduced. Nevertheless, as mentioned above, the frequency bandwidth of the luminance signal 3 is about 4 MHz, while it is only about 2.6 MHz at the output of the multiplexer 9. In other words, the design of the luminance signal transmission system is very marginal, while the color-difference signal transmission system has an ample margin in its design. That is to say, the great problem of the prior art system shown in FIG. 1 is that for lack of balance of frequency bandwidth between the luminance signal system and the color difference signal system, the color difference signal system has an ample margin while the luminance signal system has a very marginal recording and playback operation. As a consequence, the magnetic tape is not utilized efficiently as a recording medium.

SUMMARY OF THE INVENTION

Accordingly, it is an object of the present invention to provide a component video tape recorder in which the color difference signals are baseband-processed so that the luminance signal and the color difference signals are split into two signal series of substantially the same frequency bandwidth, thus effectively utilizing the magnetic tape making up a recording medium while at the same time reducing the size of the hardware for producing a high-quality reproduced image, production cost and tape consumption.

Another object of the present invention is to provide a video tape recorder which is capable of accurate signal processing in time axis conversion.

According to the present invention, there is provided a video signal recording and reproducing apparatus, in which the luminance signal and the two color difference signals are baseband-processed before recording. First, the luminance signal, the (R-Y) signal and the (B-Y) signal are split every other line into two signal series. (The color information, which may be available in various forms, is assumed to be the (R-Y) signal and (B-Y) signal in the following description.) The luminance signal, after being split, is expanded along the time axis until it almost exceeds the horizontal blanking period. The (R-Y) signal and the (B-Y) signal split are compressed along the time axis and inserted respectively following the time-axis-expanded luminance signal. In this way, the luminance signal, the (R-Y) signal and the (B-Y) signal equivalent to one horizontal scan period are processed along the time axis for multiplexing to be converted into a signal of two horizontal scan periods. The other split signals are also subjected to a similar process.

The effective video signal period except the blanking period in a horizontal scan period is about 53 μs, and the luminance signal is expanded along the time axis until after the next horizontal blanking to 70 μs. The (R-Y) signal and (B-Y) signal, on the other hand, are compressed along time axis into 23 μs respectively. As a result, these signals that are a luminance signal of 70 μs, an (R-Y) signal of 23 μs, a (B-Y) signal of 23 μs and a horizontal blanking period of 10 μs are combined and converted into a multiplexed signal lasting exactly over the two horizontal scan periods of 126 μs. Under this condition, the frequency bandwidths are:

$$\text{Luminance signal} \ldots 4 \text{ MHz} \times \frac{53 \ \mu s}{70 \ \mu s} = 3.0 \text{ MHz} \quad (1)$$

$$\text{color-difference signals} \ldots 1.3 \text{ MHz} \times \frac{53 \ \mu s}{23 \ \mu s} = 3.0 \text{ MHz} \quad (2)$$

They are the same for both the luminance signal and the color-difference signals. The other of the split signal have of course the same frequency bandwidth of 3.0 MHz.

In this manner, the frequency bandwidths after splitting are balanced and are made of the very narrow width of 3.0 MHz. As a result, effective use of the magnetic tape and high-quality reproduced picture are made possible.

BRIEF DESCRIPTION OF THE DRAWINGS

FIG. 15 is a block diagram showing a configuration of a timing compensator.

FIG. 16 shows waveforms indicating the conditions of the timing compensator of FIG. 15.

DESCRIPTION OF THE PREFERRED EMBODIMENTS

Now, an embodiment of the present invention will be described with reference to FIGS. 3 and 4.

Figure 1:
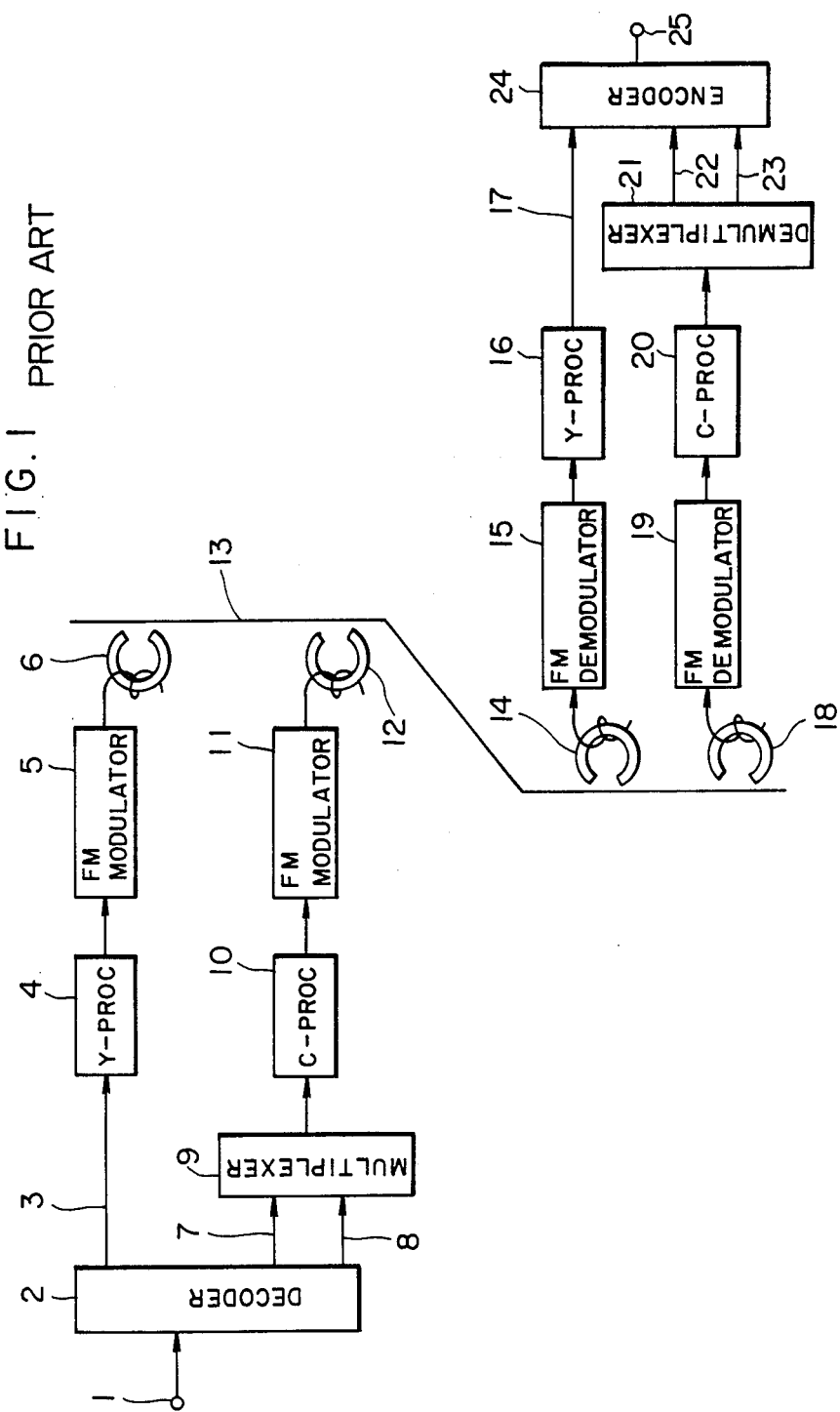
FIG. 1 is a block diagram showing a conventional system.
Figure 2:
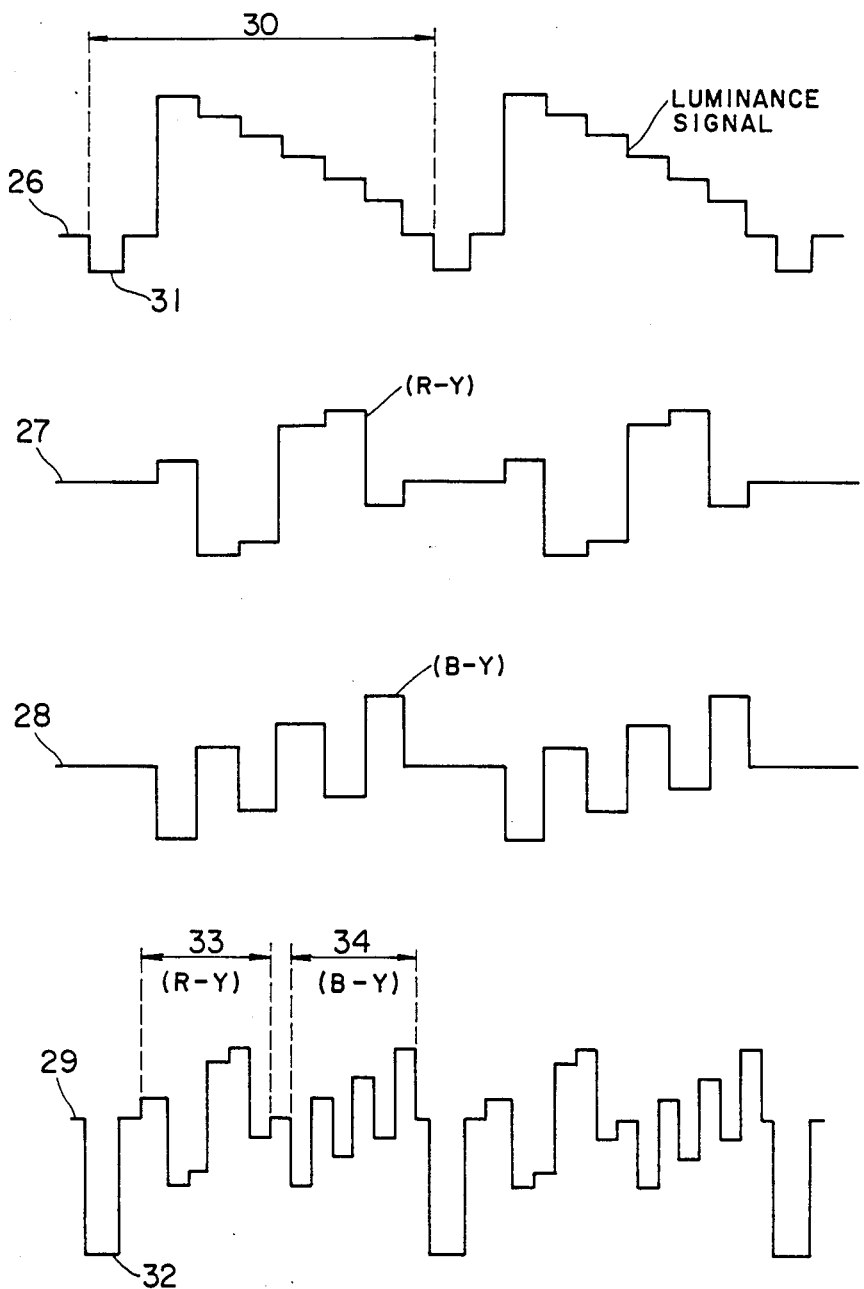
FIG. 2 shows waveforms indicating the conditions of the respective parts of the system of FIG. 1.
Figure 3:
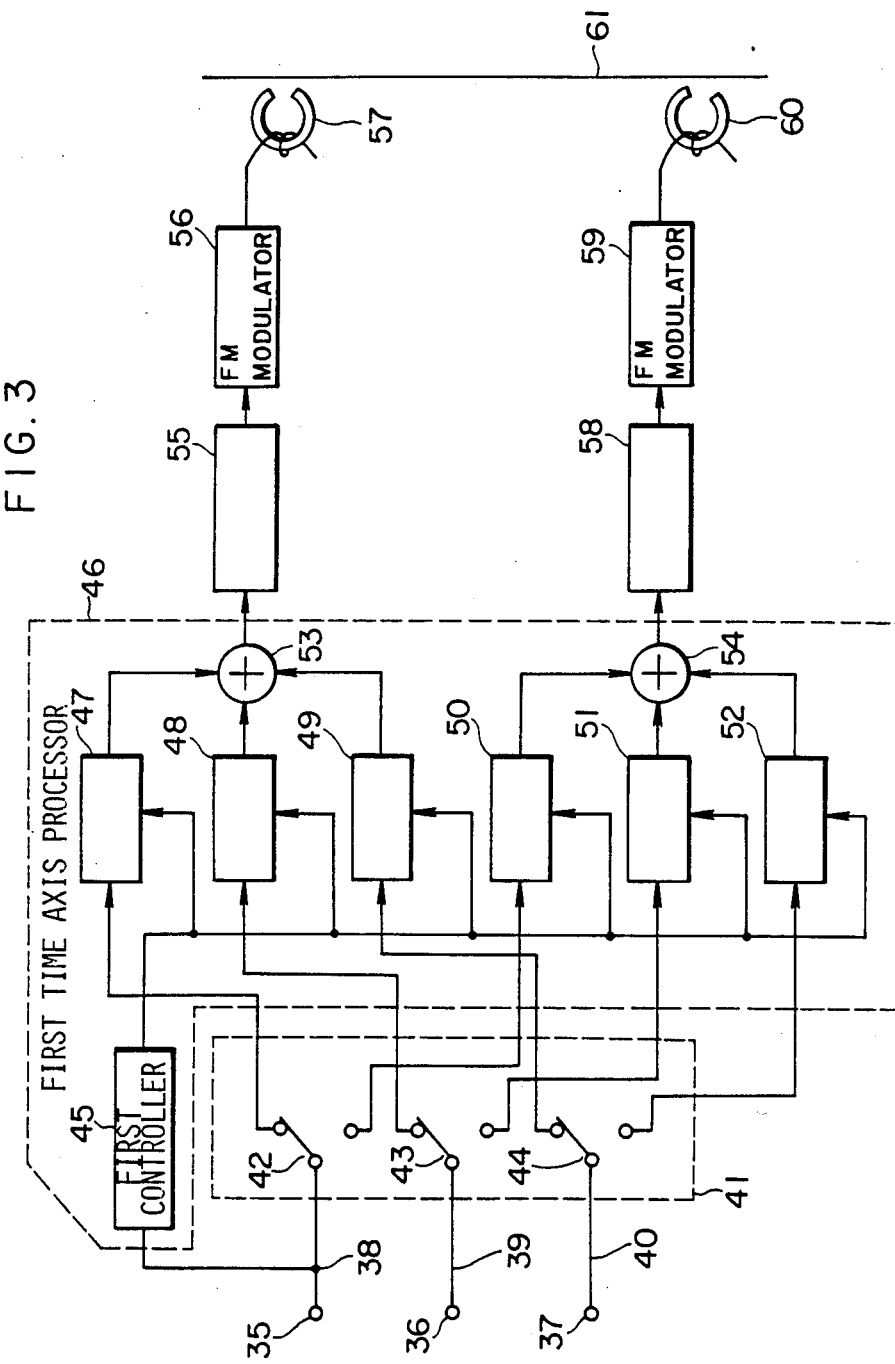
FIG. 3 is a block diagram showing the recording part of an embodiment of the present invention.
Figure 4:
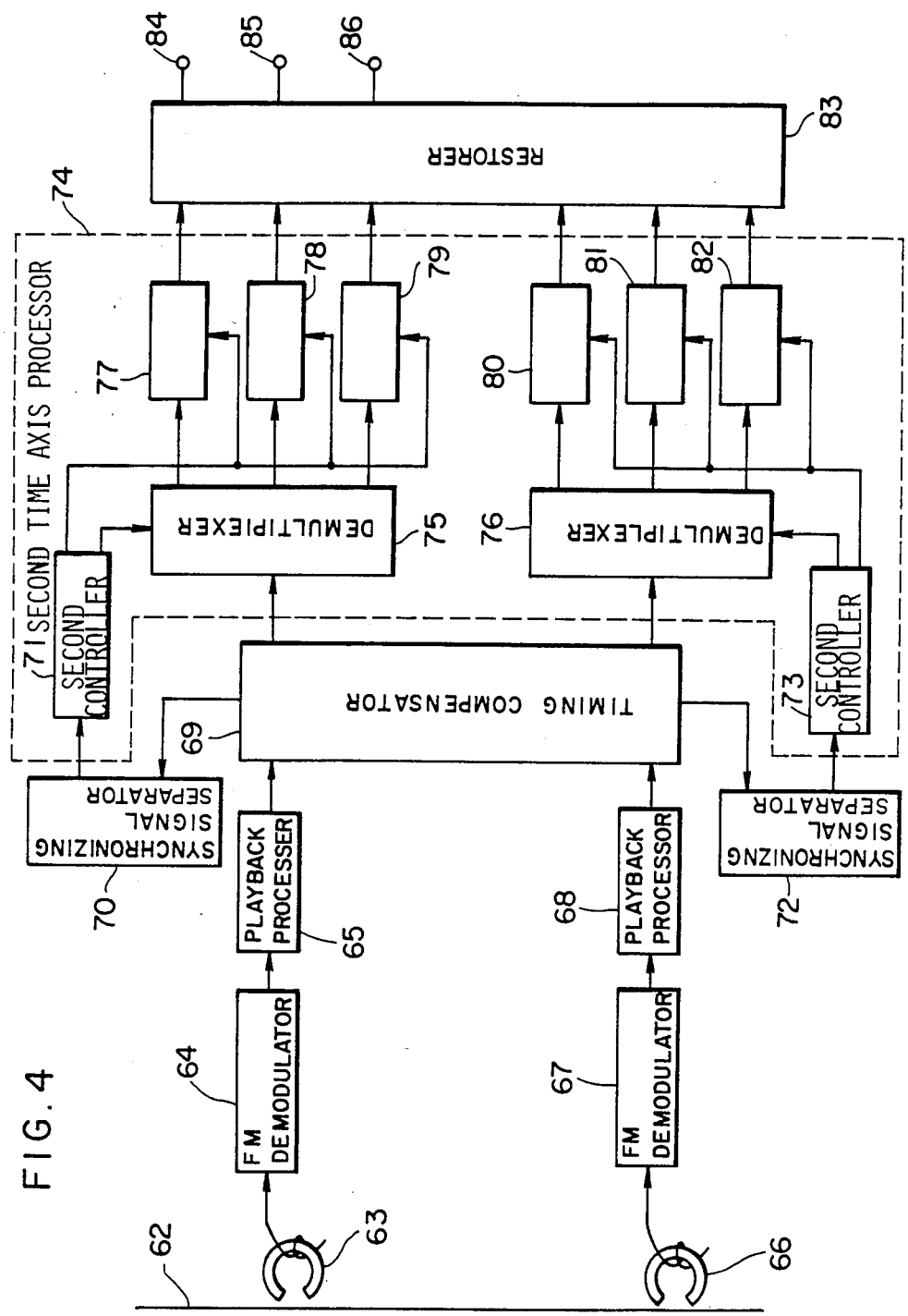
FIG. 4 is a block diagram showing the reproducing part of an embodiment of the present invention.

FIG. 3 shows a block diagram indicating the recording part of an embodiment of the present invention, and FIG. 4 a block diagram showing the reproducing part of an embodiment of the present invention.

In FIG. 3, numeral 38 designates a luminance signal, numeral 39 an (R-Y) signal, numeral 40 a (B-Y) signal, 35 a luminance signal input terminal, numeral 36 an (R-Y) signal input terminal, numeral 37 a (B-Y) signal input terminal, numeral 45 a first controller, numeral 41 a signal divider, numerals 42 to 44 switches, numeral 46 a first time axis processor, numerals 47 to 52 time axis converters, numerals 53, 54 multiplexers, numerals 55, 58 recording processors, numeral 56, 59 FM modulators, numerals 57, 60 recording heads, and numeral 61 a magnetic tape.

The video signal to be recorded is decoded into the luminance signal, (R-Y) signal and the (B-Y) signal, and applied to the luminance signal input terminal 35, the (R-Y) signal input terminal 36, and the (B-Y) signal input terminal 37 respectively. The decoder is not shown in FIG. 3. The luminance signal 38, the (R-Y) signal 39 and the (B-Y) signal 40 are applied to the divider 41 including the switches 42 to 44. The switches 42 to 44 are synchronously switched per each horizontal scan, so that the switch 42 separates the luminance signal 38, the switch 43 the (R-Y) signal 39, and the switch 44 the (B-Y) signal 40 for each horizontal scan.

From the divider 41, the luminance signal, the (R-Y) signal and (B-Y) signal which were split every other horizontal scan into two signal groups are applied to the first time axis processor 46 respectively. The first time axis processor 46 includes time axis converters 47 to 52, the first controller 45 and the multiplexers 53, 54.

The time converters 47 to 49 are supplied with the luminance signal, (R-Y) and (B-Y) signal synchronously every other horizontal scan period. The time converter 47 time-expands the luminance signal applied thereto, while the time converters 48 and 49 time-compress the (R-Y) signal and (B-Y) signal applied thereto. The outputs of these time converters 47 to 49 are applied to and combined at the multiplexer 53.

The output signal of the multiplexer 53, after being subjected to such processes as pre-emphasis, clamp and clip, is FM-modulated at the FM modulator 56, and through the recording head 57, is recorded in the magnetic tape 61.

The other luminance signal, (R-Y) signal and (B-Y) signal split at the divider 41, on the other hand, are applied to the time axis converters 50 to 52 respectively. The succeeding time axis converters 50 to 52, the multiplexer 54, the recording processor 58, FM modulator 59 and the recording head 60 are similar to the time axis converters 47 to 49, multiplexer 53, recording processor 55, FM modulator 56 and recording head 57 respectively, and will not be described again.

In order to further clarify the first time axis processor 46 and the signal flow in FIG. 3, description will be made more in detail with reference to FIG. 5.

Figure 5:
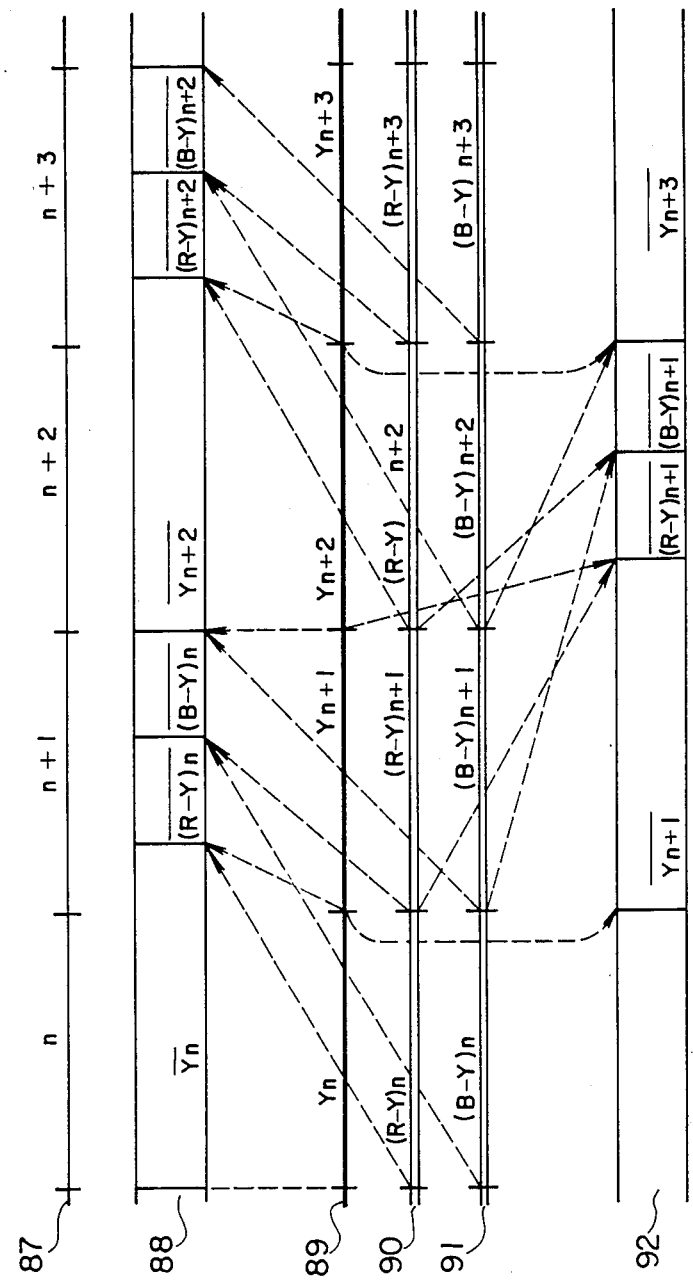
FIG. 5 is a timing chart showing the conditions of the respective parts of FIG. 3.

FIG. 5 shows a timing chart indicating the flow of signals at respective parts of FIG. 3. Numeral 87 designates a horizontal scan period, numeral 89 a luminance signal, numeral 90 an (R-Y) signal, numeral 91 a (B-Y) signal, numerals 88 and 92 multiplexed signals. Characters "n", "n+1" ... designate the n-th horizontal scan, the (n+1)th horizontal scan, and so on, while "$Y_n$", "$(R-Y)_n$" and "$(B-Y)_n$" designate the luminance signal (R-Y) signal and the (B-Y) signal for the n-th horizontal scan period respectively. (Each suffix indicates the number at which horizontal scan occurs.) The bar "-" indicates that it is converted along the time axis.

Numerals 89, 90, 91, 88 and 92 designate signals applied to the luminance signal input terminal 35, the (R-Y) signal input terminal 36, (B-Y) signal input terminal 37, the recording processor 55 and the recording processor 58 respectively shown in FIG. 3. Of all the signals including the luminance signal 38, (R-Y) signal 39 and (B-Y) signal 40 applied to the luminance signal input terminal 35, (R-Y) signal input terminal 36, and (B-Y) signal input terminal 37, respectively the signals $Y_n$, $(R-Y)_n$ and $(B-Y)_n$ for the n-th horizontal scan period are introduced through the divider 41 to the time axis converters 47 to 49 respectively. The time axis converter 47 expands the time axis of the luminance signal $Y_n$ applied thereto into $\overline{Y_n}$. The time axis converter 48 compresses the time axis of the (R-Y) signal $(R-Y)_n$ into $\overline{(R-Y)_n}$, and the time axis converter 49 the (B-Y) signal $(B-Y)_n$ into $\overline{(B-Y)_n}$. These signals $\overline{Y_n}$, $\overline{(R-Y)_n}$ and $\overline{(B-Y)_n}$ are multiplexed at the multiplexer 53 into a signal 88.

As the signals for the (n+1)th scan period, the luminance signal $Y_{n+1}$ and two color difference signals $(R-Y)_{n+1}$ and $(B-Y)_{n+1}$ are applied through the divider 41 to the time axis converters 50, 51 and 52 respectively. The time axis converter 50 expands the time axis of the luminance signal $Y_{n+1}$ applied thereto and produces $\overline{Y_{n+1}}$. The time axis converter 51 compresses the the time axis of the (R-Y) signal $(R-Y)_{n+1}$ to produce the signal $\overline{(R-Y)_{n+1}}$, while the time axis converter 52 compresses the time axis of the (B-Y) signal $(B-Y)_{n+1}$ to produce the signal $\overline{(B-Y)_{n+1}}$. These signal segments $\overline{Y_{n+1}}$, $\overline{(R-Y)_{n+1}}$ and $\overline{(B-Y)_{n+1}}$ are multiplexed in the multiplexer 54 to produce the signal 92. Similar operations are repeated subsequently. Finally, if $k=2m$ ($m=0, 1, 2, \ldots$), the FM modulator 56 is sequentially supplied with the signal segments $\overline{Y_{n+k}}$, $\overline{(R-Y)_{n+k}}$ and $\overline{(B-Y)_{n+k}}$ for the (n+k)th and (n+k+1)th horizontal scan periods. The FM modulator 59, on the other hand, is supplied with $\overline{Y_{n+k+1}}$, $\overline{(R-Y)_{n+k+1}}$ and $\overline{(B-Y)_{n+k+1}}$ sequentially for the (n+k+1)th and (n+k+2)th horizontal scan periods. In this way, $\overline{Y_n}$, $\overline{(R-Y)_n}$ and $\overline{(B-Y)_n}$, $Y_{n+2}$, $(R-Y)_{n+2}$, $(B-Y)_{n+2}$, ... are sequentially recorded through the recording head 57, and $\overline{Y_{n+1}}$, $\overline{(R-Y)_{n+1}}$, $\overline{(B-Y)_{n+1}}$, $Y_{n+3}$, $\overline{(R-Y)_{n+3}}$, $\overline{(B-Y)_{n+3}}$, ... are recorded sequentially through the recording head 60.

Figure 6:
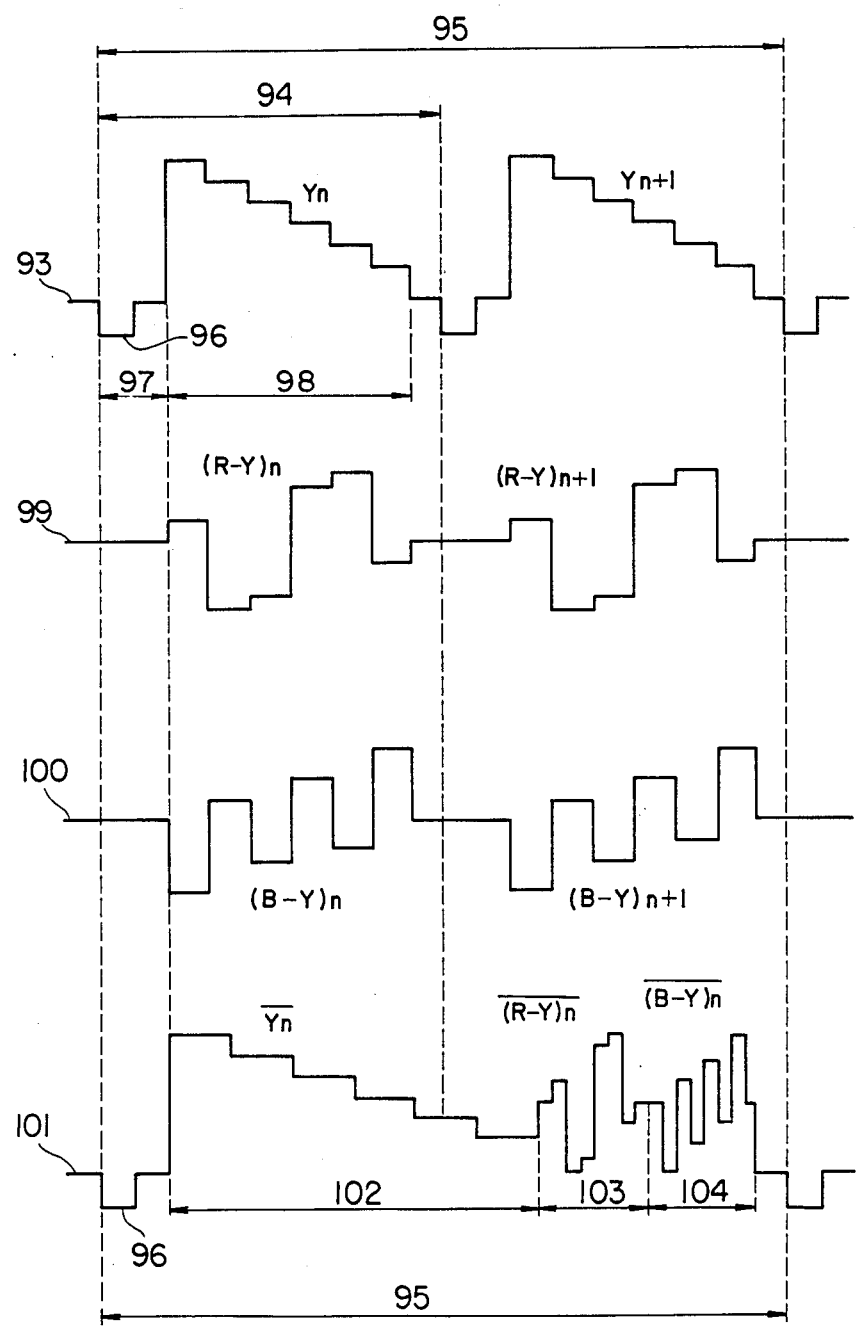
FIG. 6 shows waveforms indicating the conditions of the respective parts of FIG. 3.

Further, the conditions of the respective parts are shown by waveforms in FIG. 6.

In FIG. 6, numeral 93 designates a luminance signal, numeral 99 an (R-Y) signal, numeral 100 a (B-Y) signal, numeral 101 a multiplexed signal, numeral 94 a horizontal scan period, numeral 97 a horizontal blanking period, numeral 98 an effective period, numeral 95 two horizontal scan periods, numeral 102 a luminance signal effective period after the time expansion, numeral 103 and 104 color difference signal effective periods after the time compression, and numeral 96 a synchronizing signal. Waveforms 93, 99, 100 and 101 correspond to the luminance signal 38, (R-Y) signal 39, (B-Y) signal 40 and the output signal of the multiplexer 53 respectively. Of all the luminance signals shown by waveform 93, the signal $Y_n$ is expanded along the time axis by the time axis converter 47 to the signal $\overline{Y}_n$ of waveform 101. The (R-Y) signal (R-Y)$_n$ shown by waveform 99, on the other hand, is compressed along the time axis by the time axis converter 48 into $\overline{(R-Y)_n}$ of the waveform 101. Also, the (B-Y) signal (B-Y)$_n$ shown by the waveform 100 is compressed along the time axis by the time axis converter 49 into the signal $\overline{(B-Y)_n}$ of waveform 101.

Taking a video signal of the NTSC system as an example, the horizontal scan period continues for about 63 μs, a blanking period for about 10 μs, and an effective scan period for about 53 μs. As to the outputs of the time axis converters 47, 48 and 49, on the other hand, the effective period 102 of the luminance signal is assumed to be 70 μs, the effective period 103 of the (R-Y) signal and 104 of the (B-Y) signal to be 23 μs respectively. Also, it is assumed that the required frequency bandwidth of the luminance signal 93, (R-Y) signal 99 and the (B-Y) signal 100 are 4.0 MHz, 1.3 MHz and 1.3 MHz respectively. As shown by equations (1) and (2), the frequency bandwidth of the multiplexed signal 101 is 3.0 MHz for both the luminance signal and color difference signal components.

Now, the reproducing part of an embodiment of the present invention will be explained with reference to FIG. 4.

FIG. 4 is a block diagram showing the reproducing part according to an embodiment of the present invention. In FIG. 4, numeral 62 designates a magnetic tape, numerals 63, 66 playback heads, numerals 64, 67 FM demodulations, numerals 65, 68 playback processors, numeral 69 a timing compensator, numeral 74 a second playback time axis processor, numerals 75, 76 demultiplexers, numerals 77 to 82 time axis converters, numeral 83 a restorer, numeral 84 a luminance signal output terminal, numeral 85 an (R-Y) signal output terminal, numeral 86 a (B-Y) signal output terminal, numerals 70, 72 sync signal separators, and numerals 71, 73 second controllers. The magnetic tape 62 is identical to the magnetic tape 61 shown in FIG. 3 and is such that the track recorded by the recording head 57 and the track recorded by the recording head 60 are traced by the playback heads 63 and 66 respectively thereby to pick up the information recorded. The output of the playback head 63 is FM-demodulated by the FM demodulator 64 and applied to the playback processor 65. The playback processor 65, after such processes as de-emphasis and clamp, applies the output thereof to the timing compensator 69. The signal picked up at the playback head 66, on the other hand, is also FM-demodulated at the FM demodulator 67, and, after such processes as de-emphasis and clamp at the playback processor 68, is applied to the timing compensator 69. In the case where a signal is divided into two systems at the time of recording, and recorded simultaneously through a couple of recording heads and then they are reproduced, the geometric difference between the two recording heads and the two playback heads or the expansion or contraction of the magnetic tape generally cause a timing difference between the two reproduced signals. The timing compensator 69 is for compensating this timing difference of the signals reproduced by the two playback heads 63 and 66.

The timing difference of the output signals of the playback processors 65 and 68 is compensated at the timing compensator 69, and the resulting signals are applied to the second time axis processor 74. The second time processor 74 includes demultiplexers 75, 76, second controllers 71, 73, and time axis converters 77 to 82. The second time axis processor 74 operates in a reverse way to that of the first time axis processor 46 shown in FIG. 3 and supplies an output thereof to the restorer 83. The output signal of the playback processor 65, after being applied through the timing compensator 69, is applied to demultiplexer 75, and is separated into the time-axis expanded luminance signal, the time-axis-compressed (R-Y) signal and (B-Y) signal. The luminance signal, (R-Y) and (B-Y) signals thus separated are applied to the time axis converters 77 to 79 respectively. The output signal of the playback processor 68 is also similarly applied, through the timing compensator 69, the demultiplexer 76 and the time axis converters 80 to 82 to be converted into the luminance signal, (R-Y) and (B-Y) signals, which are supplied to the restorer 83. The restorer 83 switches the outputs of the time axis converters 77 to 79 and the time axis converters 80 to 82 every horizontal scan period, and thus restores the original luminance signal, (R-Y) signal and (B-Y) signal, which are produced through the luminance signal output terminal 84, (R-Y) signal output terminal 85 and (B-Y) signal output terminal 86 respectively. The outputs of the playback processors 65 and 68 are equal to the outputs of the multiplexers 53 and 54 respectively in FIG. 3, while the outputs of the time converters 77 to 82 are of course equal to the inputs of the time axis converters 47 to 52 of FIG. 3 respectively.

A signal equal to the waveform 101 of FIG. 6 is produced from the timing compensator 69, and the sync signal 96 is picked up at the sync signal separator 70. The sync signal 96 thus picked up is applied to the reproducing part second controller 71 to control the second time axis processor 74. The sync signal separator 72 and the second controller 73 operate similarly to control the second time axis processor 74.

Now, the time axis converters 47 to 52 in FIG. 3 and the time axis converters 77 to 82 in FIG. 4 will be explained below.

A system of time conversion relys either upon an analog method in which such element as CCD, BBD or condenser memory is used or upon a digital method in which a RAM (random access memory) or a shift register is used. An embodiment using a RAM will be explained with reference to FIG. 7.

Figure 7:
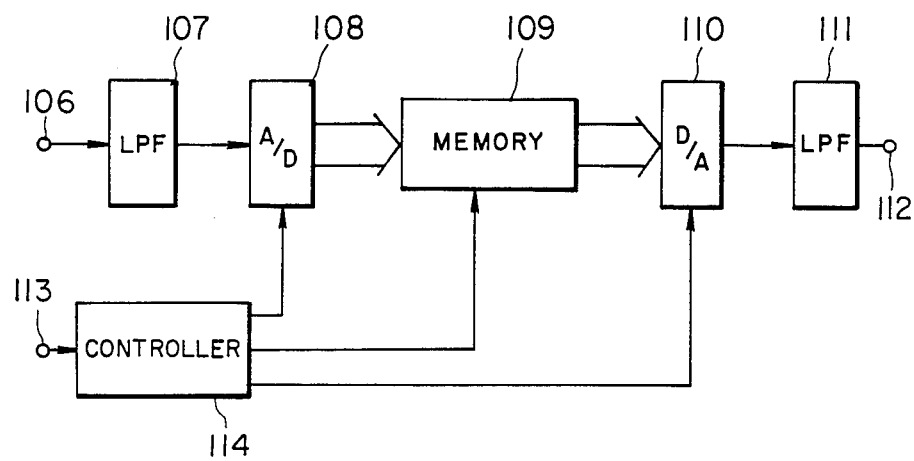
FIG. 7 is a block diagram showing the configuration of a time-axis converter.

FIG. 7 is a block diagram showing an embodiment of the time axis converters 47 to 52 and 77 to 82 in FIGS. 3 and 4. Numeral 106 designates an input terminal, numeral 107 a low-pass filter (which is designated as "LPF" in FIG. 7), numeral 108 an analog-digital converter (designated as "A/D" in FIG. 7), numeral 109 a memory, numeral 110 a digital-analog converter (designated as "D/A" in FIG. 7), numeral 111 a low-pass filter (designated as "LPF" in FIG. 7), numeral 112 an output terminal, numeral 113 a sync signal input terminal, numeral 114 a controller.

The signal applied through the input terminal 106, after the unnecessary components thereof out of the required frequency band are removed at the low-pass filter 107, is converted to digital form at the analog-digital converter 108 and is stored in the memory 109. The memory 109 includes a RAM, the output of which is reconverted to an analog signal by the digital-analog converter 110, and after the unnecessary components thereof are removed by the low-pass filter 111, is produced through the output terminal 112 as a time-converted signal. On the other hand, a sync signal is applied through the sync signal input terminal 113 to the controller 114, which, on the basis of the sync signal applied thereto, controls the analog-digital converter 108, memory 109 and the digital-analog converter 110.

Figure 8:
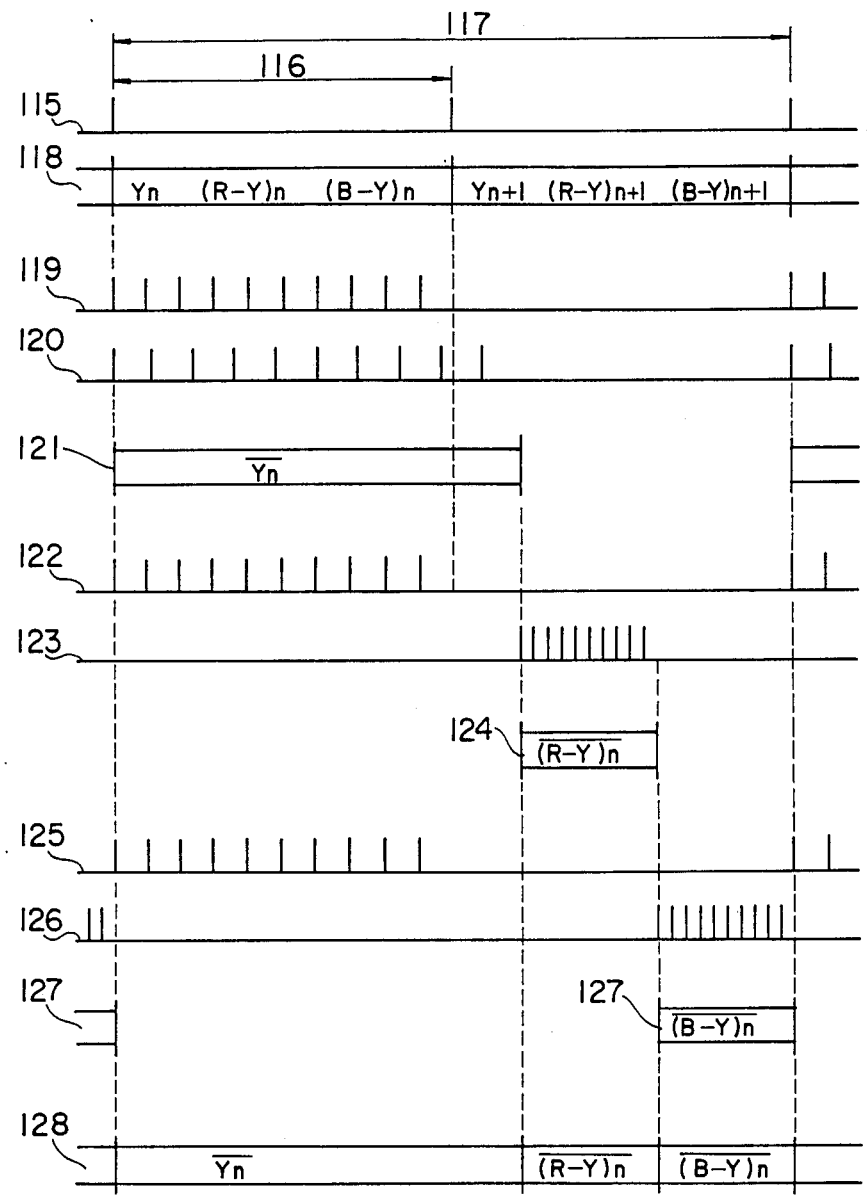
FIGS. 8 and 9 are timing charts indicating the conditions of the respective parts of FIG. 7.

Now, the conditions of respective parts will be explained with reference to FIG. 8 about the case in which the time axis converter shown in FIG. 7 are used for recording. In FIG. 8, numeral 115 designates a horizontal scan timing, numeral 118 a luminance signal, (R-Y) signal and (B-Y) signal to be recorded, numerals 119, 120 write and read clock signals respectively used for time-axis-expansion of the luminance signal, numeral 121 a luminance signal expanded along the time axis, numerals 122, 123 write and read clock signals respectively used for time-axis-compression of the (R-Y) signal, numeral 124 an (R-Y) signal compressed along the time axis, numerals 125, 126 write and read clock signals respectively used for time-axis-compression of the (B-Y) signal, numeral 127 a (B-Y) signal time compressed, numeral 128 an outpout of the multiplexer 53 in FIG. 3, numeral 116 a horizontal scan period, and numeral 117 two horizontal scan periods.

In the case where the time axis converter of FIG. 7 is used as the time axis converter 47 of FIG. 3, the luminance signal 93 is introduced through the input terminal 107 to the low-pass filter 107. This luminance signal 93 is made up of $Y_n, Y_{n+2}, \ldots$ designated by 93 in FIG. 6. The sync signal 96 contained in the luminance signal 93 is applied through the sync signal input terminal 113 to the controller 114.

The output of the low-pass filter 107 is digitized at the analogue-digital converter 108. If the frequency band of the luminance signal is about 4 MHz, the sampling frequency, is 8 MHz or more, or actually, at least 10 MHz. It is assumed that the sampling frequency is 640 times that of the horizontal scan frequency, that is, at 10.07 MHz. The luminance signal is thus sampled at 10.07 MHz ($=640 f_H$, where $f_H$ is the horizontal scan frequency) and is stored in the memory 109 with the write clock signal as designated by 119 at the same time. The write clock signal 119 is available at 10.07 MHz ($=640 f_H$) only for the n-th and (n+2)th scan periods. In comparison, the read clock signal 120 of the memory 109 is set at the frequency of, say, 7.62 MHz ($=484 f_H$). The read clock signal 120 is thus generated immediately after starting of the write clock 119 and ends about 70 μs later. This read clock is of course supplied also to the digital-analogue converter 110. The write clock signal 119 is 10.07 MHz and comprises 640 pulses in the horizontal scan period, so that the luminance signal $Y_n$ is divided into 640 picture elements and stored in the memory 109. The read clock signal 120, on the other hand, is used to read out the content of the memory 109 at the frequency of 484 $f_H$, and therefore the luminance signal is expanded along the time axis as shown by 121. The write clock signal 119 and the read clock signal 120 are both generated by the controller 114.

In the case where the time axis converter of FIG. 7 is applied as the time axis converter 48 of FIG. 3, the write clock signal 122 is used to drive the analogue-digital converter 108 at 4.37 MHz ($=278 f_H$) thereby to divide the signal segment $(R-Y)_n$ into 278 picture elements. The write clock 122 is available at 4.37 MHz only for the n-th horizontal scan period, while the read clock 123 is started immediately after the end of $\overline{Y_n}$ to read out the content of the memory 109 at the frequency of, say, 10.07 MHz ($=640 f_H$) with the result that the low-pass filter 111 produces an output 124.

Further, in the case where the time axis converter of FIG. 7 is applied as the time axis converter 49 of FIG. 3, the write clock signal for driving the analogue-digital converter 108 and for writing in the memory 109 is 4.37 MHz ($=278 f_H$) as designated by 125, while the clock signal for driving the analogue-digital converter 110 and the reading memory 109 is 10.07 MHz ($=640 f_H$) as designated by 126. The $\overline{(B-Y)_n}$ of the low-pass filter 111 is produced immediately after the end of $\overline{(R-Y)_n}$ as designated by 127.

In this manner, the output of the multiplexer in FIG. 3 takes the form as designated by 128.

The controller 114 shown in the block diagram of the time axis converter of FIG. 7 is included in the first controller 45 shown in FIG. 3, and controls the luminance signal, the (R-Y) signal and the (B-Y) signal for time conversion thereof at proper timing.

The conditions of the time axis converters 77 to 79 in the reproducing side shown in FIG. 4 will be explained with reference to FIG. 9.

Figure 9:
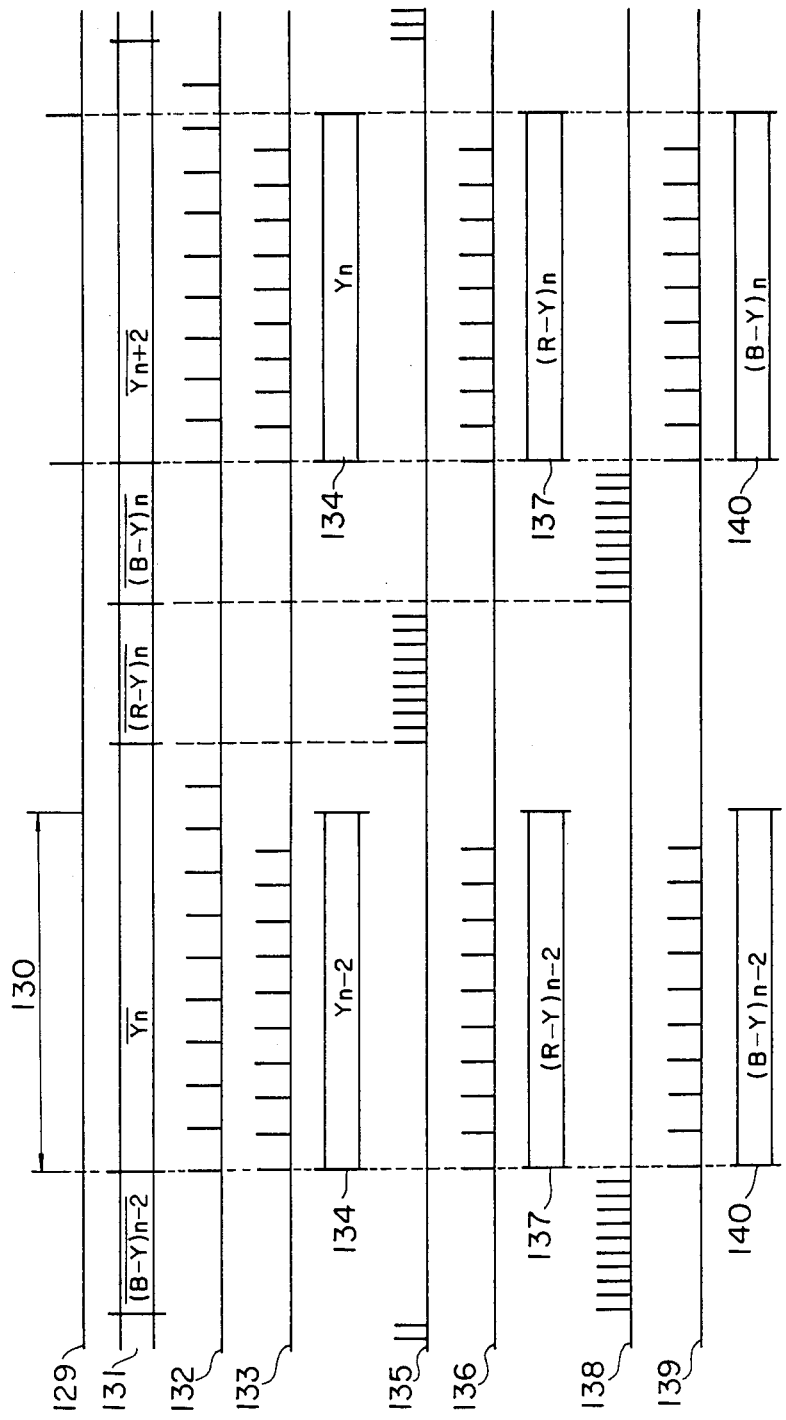

FIG. 9 is a timing chart used for various parts in which the time axis converters of FIG. 7 are applied as the time axis converters 77 to 79 in FIG. 4. In FIG. 9, numeral 130 designates a horizontal scan period, numeral 129 a horizontal scan timing, numeral 131 a multiplexed signal applied to the demultiplexer 75, numerals 132 135, 138 write clock signals, numerals 133, 136, 139 read clock signal, and numerals 134, 137, 140 output signals of the time axis converters 77 to 79 respectively. In the case of the time axis converter 77 shown in FIG. 4, the $\overline{Y_{n-2}}, \overline{Y_n}, \overline{Y_{n+2}}$ output from the demultiplexer 75 are selected and applied to the low-pass filter 107. The clock signal for driving the analogue-digital converter 108 and for writing in the memory 109 is 7.62 MHz ($=484 f_H$) and comprises 640 clock pulses as designated by 132. This clock signal 132 is used to divide $\overline{Y_n}$ into 640 picture elements and store them into the memory 109. The clock signal for driving the digital-analogue converter 110 and reading the memory 109 is designated by 133 and is of 10.07 MHz ($=640 f_H$) and comprises 640 clock pulses. The read clock 133 starts immediately before the write clock 132. Thus the output signal of low-pass filter 111 takes the form as indicated by 134, so that $Y_n$ is output later by two horizontal scan periods after $\overline{Y_N}$ of the signal 131.

In the case where the time axis converter of FIG. 7 is applied as the time axis converter 78 in FIG. 4, signal segments $\overline{(R-Y)_{n-2}}, \overline{(R-Y)_n}, \overline{(R-Y)_{n+2}}, \ldots$ signal 131 are selected and applied to the low-pass filter 107. The clock signal for driving the analogue-digital converter 108 and writing in the memory 109 is 10.07 MHz ($=640\ f_H$), and comprises 278 pulses as designated by 135. Each segment of $\overline{(R-Y)}_{n-2}$, $\overline{(R-Y)}_n$, $\overline{(R-Y)}_{n+2}$ ... is divided into 278 picture elements and stored in the memory 109. The clock signal for driving the digital-analogue converter 110 and reading the memory 109 is 4.37 MHz ($=278\ f_H$) and comprises 278 pulses as designated by 136. The output of the low-pass filter 111 is designated by 137 and takes the form of $(R-Y)_n$ which is produced at the same timing as $Y_n$.

In similar manner, in the case where the time axis converter of FIG. 7 is applied as the time axis converter 79 in FIG. 4, the clock for driving the analogue-digital converter 108 and writing in the memory 109 is designated by 138; the clock for driving the digital-analogue converter 110 and reading the memory 109 by 139; and the output of the low-pass filter 111 by 140.

In this way, the time axis converters 77, 78 and 79 produce the outputs 134, 137 and 140 respectively.

In the case where the time axis converter shown in FIG. 7 is used for the reproducing part, the controller 114 is included in the reproducing part 71 (and 73) of FIG. 4.

The time axis of the time axis converters is determined from the relationship between the write clock signal and the read clock signal as described above. These clock signals are generally produced in a PLL (phase locked loop) on the basis of the horizontal sync signal. The quality of the sync signal contained in the luminance signal to be recorded and that in the luminance signal reproduced is a very important factor. Specifically, especially in the reproducing part, the PLL output phase becomes unstable with deterioration of S/N. And the PLL output phase changes with deterioration of luminance signal waveform. Further, the reproducing part is subjected to time axis variations, and it is likely in a PLL based on the sync signal that the signal follow-up capability of the system may be different at the sync signal and $\overline{(R-Y)}$ or $\overline{(B-Y)}$. As a result, the output timings of Y, (R-Y) and (B-Y) are very likely to be different due to the time axis variations.

Another embodiment of the present invention which can obviate the phenomenon will be explained with reference to FIGS. 10 and 11.

Figure 10:
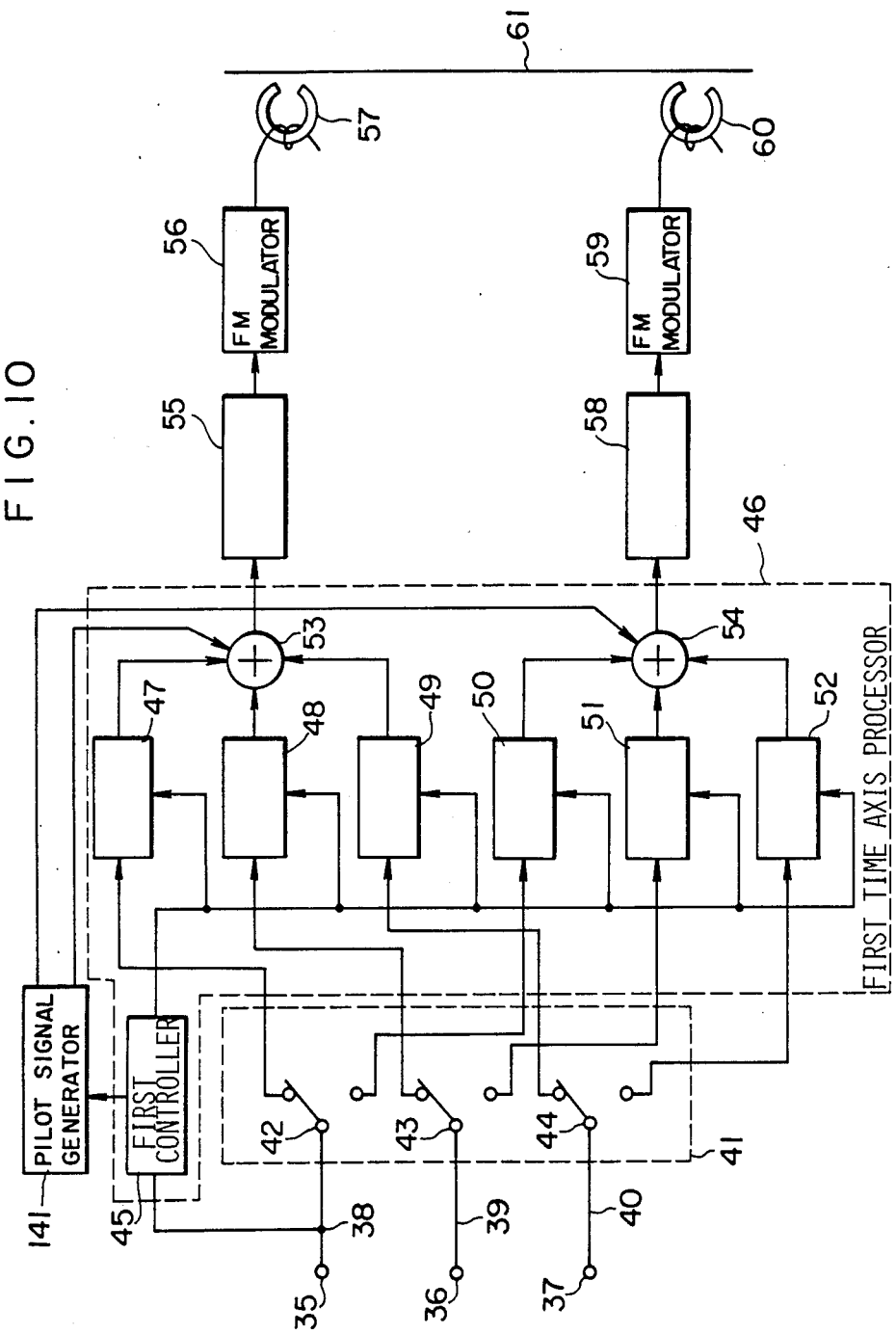
FIG. 10 is a block diagram showing the recording part of another embodiment of the present invention.

FIG. 10 is a block diagram for a recording part. In FIG. 10, numeral 141 designates a pilot signal generator. Numerals 35 to 61 designate the same component parts as those designated by the same numerals in FIG. 3 and will not be explained. The pilot signal generator 141 produces a pilot signal on the basis of a continuous wave and a sync signal produced by the first controller 45, which pilot signal is applied to multiplexers 53 and 54.

Figure 12:
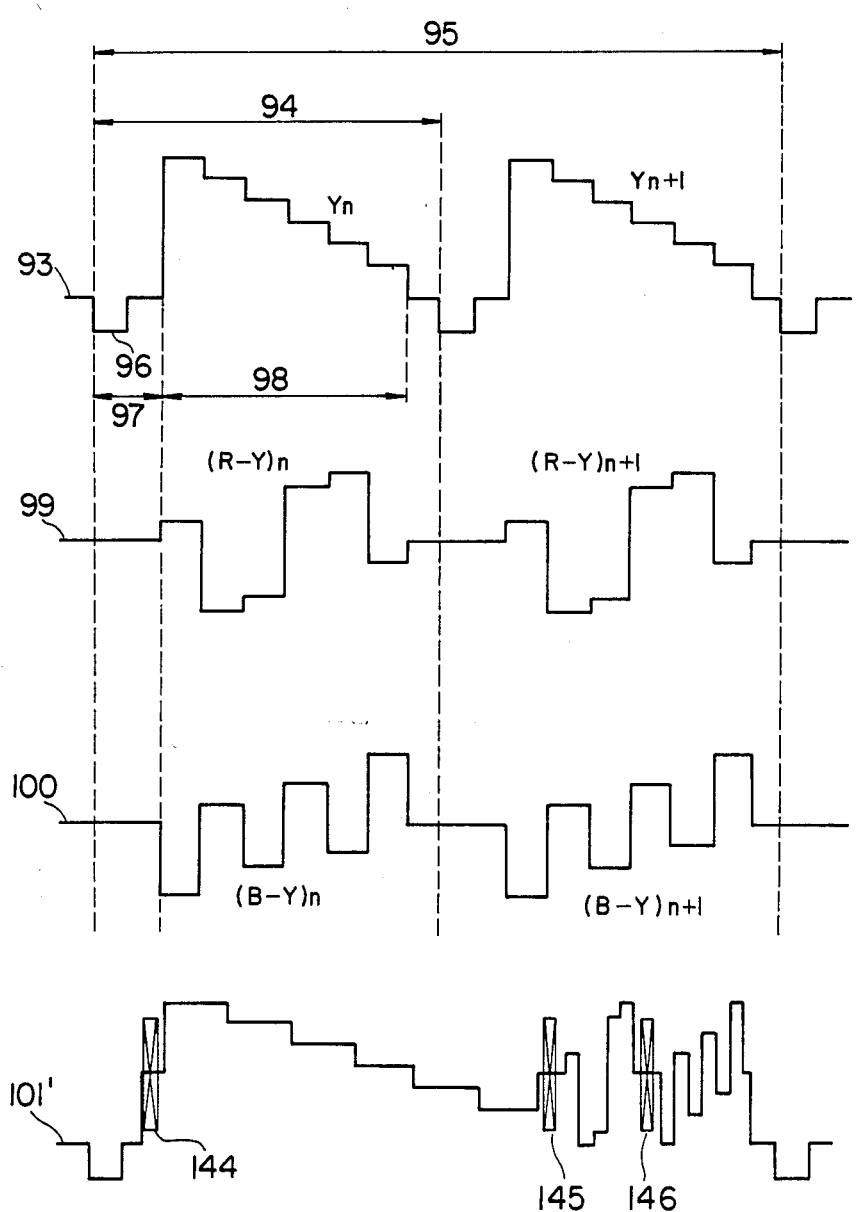
FIG. 12 shows waveforms produced at the respective parts of FIG. 10.

Waveforms produced at various parts of FIG. 10 will be explained more in detail with reference to FIG. 12. In FIG. 12, numeral 93 designates a luminance signal, numeral 99 an (R-Y) signal, numeral 100 a (B-Y) signal, numeral 101' a multiplexed signal, numeral 94 one horizontal scan period, numeral 95 two horizontal scan periods, numeral 96 a sync signal, numeral 97 a blanking period, numeral 98 an effective scan period, and numerals 144 to 146 pilot signals. Numerals 93 to 100, which designate the same component parts as the same numerals in FIG. 6 and will not be explained in detail. The luminance signal 93, (R-Y) signal 99 and (B-Y) signal 100 applied through the luminance signal input terminal 35, (R-Y) signal input terminal 36 and the (B-Y) signal input terminal 37 are converted along the time axis and applied to the multiplexer 53 respectively. The multiplexer 53 is also supplied with the pilot signals 144 to 146 produced by the pilot signal generator 141 and produces the multiplexed signal 101'. The frequency of the pilot signals 144 to 146 contained in the multiplexed signal 101' is set to a level related to the clock signal used in the time axis converters. For example, the frequency is set to 2.185 MHz ($=139\ f_H$) which is one half of the frequency 4.37 MHz ($=278\ f_H$) used for the time axis converters of (R-Y) and (B-Y) signals.

Figure 11:
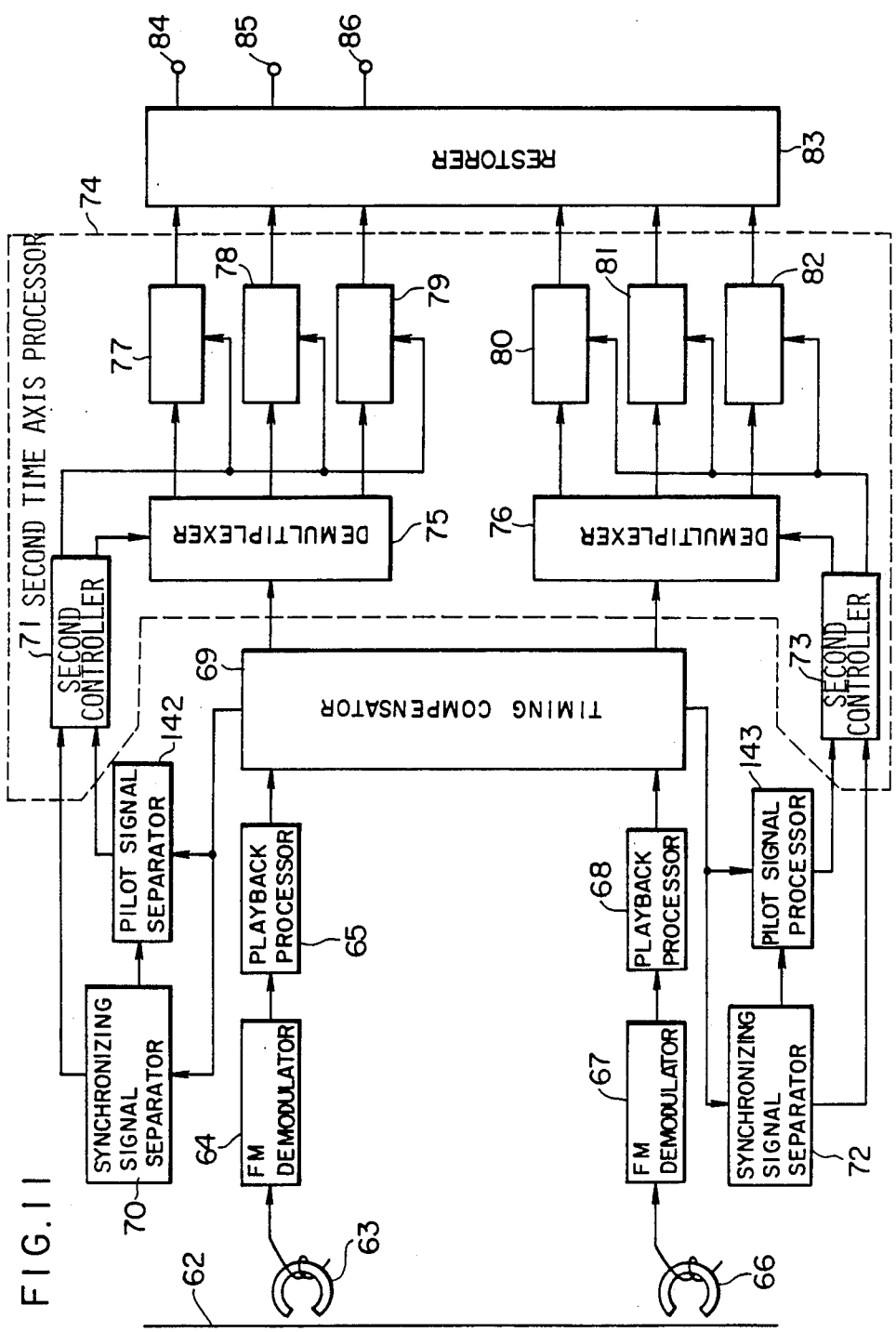
FIG. 11 is a block diagram showing the reproducing part of another embodiment of the present invention.

An embodiment for reproducing part corresponding to FIG. 10 is shown in the block diagram of FIG. 11. In FIG. 11, numerals 142 to 143 designate pilot signal separators. Numerals 62 to 86 which designate the same component parts as the same numerals in FIG. 4 will not be described. The output of the timing compensator 69 is applied to the sync signal separator 70 and to the pilot signal separator 142. The sync signal is separated from the reproduced multiplexed signal at the sync signal separator 70, and is applied to the second controller 71 and the pilot signal separator 142. The pilot signal separator 142 separates the pilot signal alone from the multiplexed signal and applied it to the second controller 71. In other words, the multiplexed signal which is produced from the timing compensator 69 corresponds to the waveform 101' of FIG. 12, so that the output of the pilot signal separator 142 is the pilot signals 144 to 146 picked up from the waveform 101'.

Figure 13:
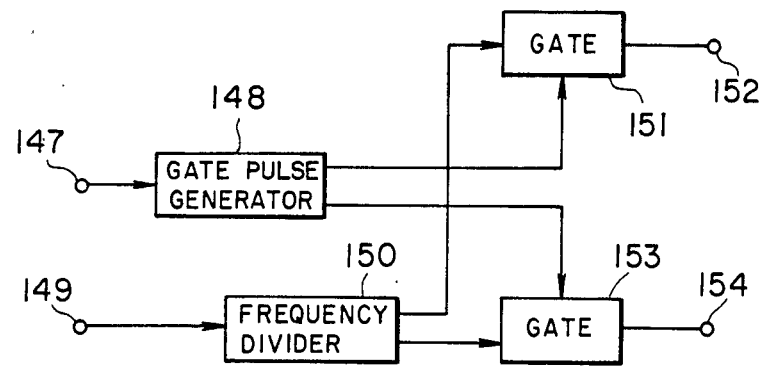
FIG. 13 is a block diagram showing the configuration of a pilot signal generator.

Further, an example of a configuration of the pilot signal generator 141 of FIG. 10 is shown by the block diagram of FIG. 13. In FIG. 13, numeral 147 designates a sync signal input terminal, numeral 149 a continuous wave input terminal, numeral 148 a gate pulse generator, numeral 150 a frequency divider, numerals 151, 153 gates, and numerals 152, 154 pilot signal output terminals. A sync signal is applied from the first controller 45 in FIG. 10 through the sync signal input terminal 147 to the gate pulse generator 148. Also, a continuous wave is applied from the first controller 45 of FIG. 10 through the continuous wave input terminal 149 to the frequency divider 150. The continuous wave applied to the continuous wave input terminal 149 has a frequency of 4.37 MHz ($=278\ f_H$), for example, which is divided by the frequency divider 150 by $\frac{1}{2}$ and applied in the form of 2.185 MHz ($=139\ f_H$) to the gates 151 and 153. The gate pulse generator 148 generates a gate pulse on the basis of the sync signal and thus controls the gates 151 and 153.

Figure 14:
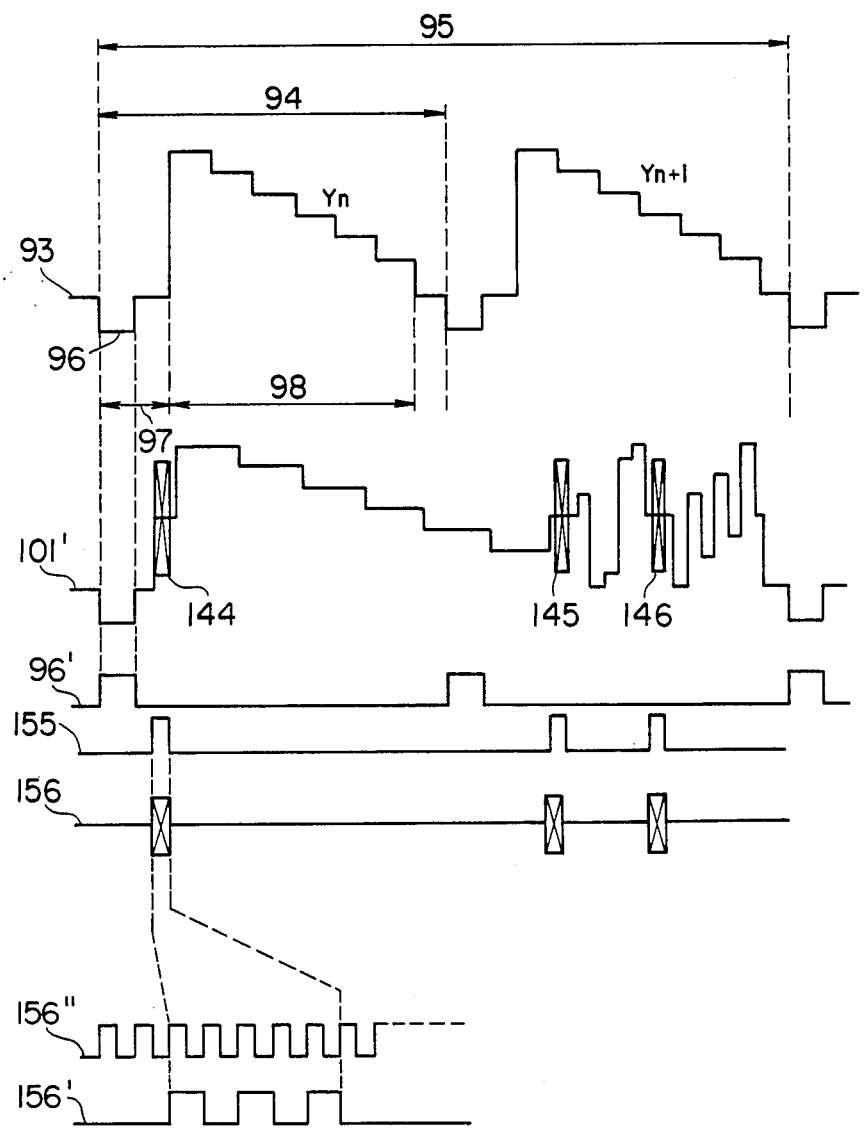
FIG. 14 shows waveforms for explaining the operation of the pilot signal generator of FIG. 13.

Waveforms produced from various parts in FIG. 13 are shown in FIG. 14. Numeral 93 designates a luminance signal, numeral 101' a multiplexed signal, numeral 96' a sync signal, numeral 155 a gate pulse, numerals 156, 156' pilot signal, numeral 156" a continuous wave, numeral 94 one horizontal scan period, and numeral 95 two horizontal scan periods. The sync signal 96' from the controller 45 of FIG. 10 is applied through the sync signal input terminal 147 and a gate pulse 155 is generated at the gate pulse generator. The continuous wave 156" generated at the first controller 45, on the other hand, is applied to and frequency-divided at the frequency divider 150 through the continuous wave input terminal 149. The output of the frequency divider 150 is applied to the gate 151 and gated by the gate pulse 155 produced at the gate pulse generator 148 thereby to produce a pilot signal 156. This signal is applied through the pilot signal output terminal 152 to the multiplexer 53 of FIG. 10 to output a waveform 101'. The output of the gate 153, on the other hand is supplied to the multiplexer 54 through the pilot signal output terminal 154. The continuous wave 156″ and the pilot signal 156′ are shown time-expanded about the period thereof where the pilot signal is outputted.

In the embodiment of FIGS. 10 to 14, the various clocks for controlling the time axis converters 77 to 82 are generated by a PLL from the pilot signal inserted, without relying merely on the sync signal contained in the luminance signal. The advantages of producing the clocks in a PLL from pilot signals over the method using a PLL from sync signals are that:

(a) The stationary state phase error or residual phase error of the PLL is smaller.

(b) By applying the pilot signal through a band-pass filter, a signal of higher S/N can be applied to the PLL.

(c) False operation of PLL can be avoided which otherwise might occur by the deterioration of the waveform of the sync signal, etc.

Also, by virtue of the fact that pilot signals are inserted in a plurality of positions during two horizontal scan periods, (d) The jitter response characteristic is improved.

(e) The phase-lock error due to jitter is substantially equal at any time in the horizontal scan period, and therefore there rarely occurs a timing error between the luminance signal and the color difference signal in the playback output.

An example of a configuration of the timing compensator 69 in FIGS. 4 and 11 is shown by a block diagram in FIG. 15. In FIG. 15, numerals 157 and 162 designate a multiplexed-signal input terminals, numeral 158 a fixed delay line, numeral 163 a variable delay line, numerals 160, 165 sync signal separators, numerals 161, 166 sync signal composers, numeral 167 a phase comparator, and numerals 159, 164 multiplexed signal output terminals. A multiplexed signal which is an output of the playback processors 65, 68 of FIG. 4 (FIG. 11) are applied through the multiplexed signal input terminals 157 and 162 to the fixed delay line 158 and the variable delay line 163 respectively. The multiplexed signal, after being slightly delayed by the fixed delay line 158, is applied to the multiplexed signal output terminal 159 and the sync signal separator 160. A sync signal is picked up from the multiplexed signal at the sync signal separator 160 and is applied to the sync signal composer 161. The sync signal picked up at the sync signal separator 160, which is lacking every other horizontal scan period, is restored at the sync signal composer configured of a PLL or the like. In similar manner, the multiplexed signal applied through the multiplexed signal input terminal 162 is delayed by the variable delay line 163 and is applied to the multiplexed signal output terminal 164 and the sync signal separator 165. The output of the sync signal separator 165 makes up a continuous sync signal through the sync signal composer 166. The phase comparator 167 compares two sync signals applied thereto to detect a phase error therebetween, and the variable delay line 163 is so controlled as to reduce the absolute value of the error. This feedback loop permits compensation for the timing error between the multiplexed signals produced at the multiplexed signal output terminals 159 and 164. These output signals makes up outputs of the timing compensator 69 shown in FIG. 4 (or FIG. 11).

The timing of the operation of each part of FIG. 15 is shown in FIG. 16. In FIG. 16, numeral 168 designates a multiplexed signal at the multiplexed signal input terminal 157, numeral 174 an output of the sync signal separator 160, numeral 175 an output of sync signal composer 161, numeral 176 a multiplexed signal applied to the multiplexed signal input terminal 162, numeral 180 an output of the sync signal separator 165, numeral 182 an output of the sync signal composer 166, numerals 171 to 173 and 177 to 179 sync signals contained in the multiplexed signal, numeral 169 the time difference between the multiplexed signals 168 and 176, numeral 170 the delay time of the fixed delay line 158, and numeral 181 the delay time of the variable delay line 163. The multiplexed signals 168 and 176 are shown to contain only the sync signal without showing the time-multiplexed luminance signal, (R-Y) and (B-Y) signals. The multiplexed signal is delayed by time 170 at the fixed delay line 158 so that the output of the sync separator 160 takes the form designated by 174. Further, the sync signal which is lacking is restored at the sync signal composer 161 and thus makes up the signal 175. The multiplexed signal 176, on the other hand, is delayed by time 181 at the variable delay line 163, so that the output of the sync signal separator 165 takes the form designated by 180. Further, the sync signal which is missing is restored at the sync signal composer 166 into the form designated by 182. The phase comparator 167 compares the phases of waveforms 175 and 182, and according to the output thereof, the delay time of the variable delay line 163 is regulated. As a result, the timings of the signals produced from the multiplexed signal output terminals 159 and 164 become equal to that of waveforms 174 and 180 respectively, thus completing compensation for timing.

Now, assume that the time axis converter shown in FIG. 7 is used as the time axis converters 47 to 52 shown in FIG. 3. A total of six controllers 114 are included in the first controller 45. An example of the construction of the controller 114 related to the time axis converter 47 will be explained below with reference to FIG. 17.

Figure 17:
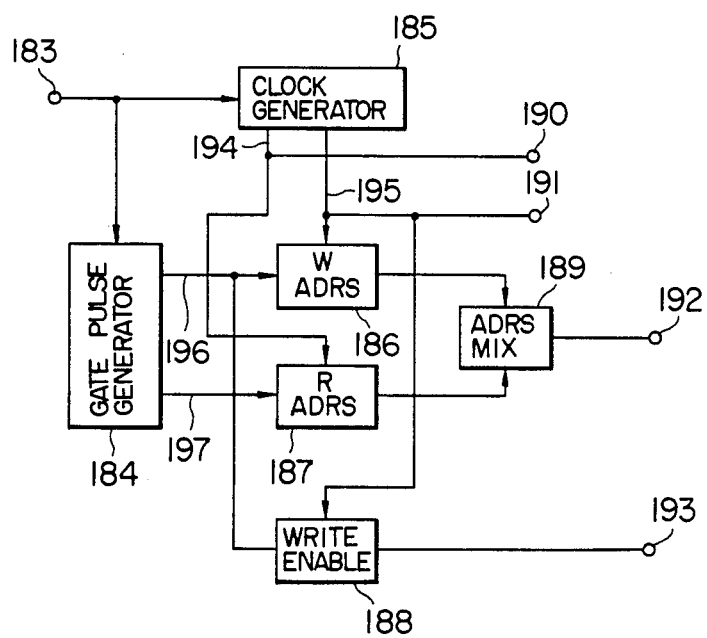
FIG. 17 is a block diagram exemplarily showing a configuration of the first controller for the first time is processed.

In FIG. 17, numeral 183 designates the sync signal input terminal, numeral 184 a gate pulse generator, numeral 185 a clock pulse generator, numeral 186 a write address counter, numeral 187 a read address counter, numeral 188 a write enable pulse generator, numeral 189 an address mixer, numerals 190, 191 clock pulse output terminals, numeral 192 an address output terminal, and numeral 193 a write enable pulse output terminal. The sync signal input terminal 183 corresponds to the terminal 113 in FIG. 7, and through this terminal 183, the sync signal is applied to the clock pulse generator 185 and the gate pulse generator 184. The clock pulse generator 185 is made up of, for example, a PLL and generates clock pulse, 194 and 195 synchronized with the having a frequency equal to an integral multiple of the frequency of the sync signal applied thereto. In the embodiment under consideration, the clock pulse 194 has the frequency of 484 $f_H$, and the clock pulse 195 has the frequency of 640 $f_H$. The gate pulse generator 184 generates gates pulses 196 and 197 on the basis of the sync signal applied thereto. The gate pulses 196 and 197 correspond to the period of writing in the memory 109 and the period of reading from the memory 109 of FIG. 7, respectively. The write address counter 196 is supplied with the clock pulse 194 and the gate pulse 196 for counting the pulses and generating a write address only during the period of writing in the memory 109. The read address counter 187, on the other hand, is supplied with the clock pulse 194 and the gate pulse 197 for counting the pulses and generating a read address only during the period of reading from the memory 109. The address mixer 189 generates an address by mixing the outputs of the write address counter 186 and the read address counter 187. The clock pulse 195 and the gate pulse 196 are applied to the write enable pulse generator 188 for generating a write enable pulse. In this manner, a clock pulse for driving the A/D converter 108 is produced through the clock pulse output terminal 190, a clock pulse for driving the D/A converter 110 is produced through the clock pulse output terminal 191, a pulse for driving the memory 109 is produced through the address output terminal 192, and a write enable pulse for controlling the memory 109 is produced through the write enable output terminal 193. The clock pulses produced from the clock pulse output terminals 190 and 191 correspond to the pulses 120 and 119 shown in FIG. 8.

Although the part of the FIG. 3 arrangement, first controller 45 was explained above with reference to FIG. 3, similar parts to those shown in FIG. 17 are naturally included (but not shown) correspond to the time axis converters 48 to 52. The frequencies of the clock pulses 194, 195 produced from the clock pulse generator 185 and the gate pulses 196, 197 produced from the gate pulse generator 184, however, are somewhat different from those explained above. The second controllers 71, 73 of FIG. 4 can be basically constructed from the controller shown in FIG. 17 and therefore will not be described in detail. Further, in the other embodiments shown in FIGS. 10 and 11, a pilot signal is applied to the clock pulse generator 185.

It will be understood from the foregoing description that according to the present invention, the following advantages are obtained:

(a) The baseband processing achieves an improved quality of the reproduced picture.

(b) The 2-channel recording reduces the relative speeds of the heads and tape and comparatively decreases the system size.

(c) After time expansion of the luminance signal and time compression of color difference signal, they are time multiplexed, so that the information frequency band width is equal not only between channels but also between the luminance signal section and the color difference signal, thus permitting effective use of mangetic tape at a saving of consumption thereof.

(d) Insertion of a pilot signal improves the accuracy of the time reverse conversion.

As mentioned above, according to the present invention luminance signal and a couple of color difference signals are divided into two systems, in each of which the luminance signal and a couple of color difference signals are multiplexed along the time axis in two horizontal scan periods. In the process, the luminance signal is expanded along the time axis to the extent slightly exceeding the next horizontal blanking period, while the two color difference signals are multiplexed along the time axis in the remaining time. By doint so, the above-mentioned advantages are obtained.

Embodiments of the present invention were explained above. The clock signals used for processing along time axis are not necessarily confined to 640 $f_H$, 484 $f_H$ and 278 $f_H$ employed in the aforementioned embodiments. Other frequency combinations can also achieve the advantages of the present invention to the extent that the luminance signal and the two color difference signals have substantially the same freqency bandwidth after time-axis processing.

The frequency of 139 $f_H$ alone is used as a pilot signal is the embodiment shown in FIGS. 10 to 14. Instead of a single frequency, however, a plurality of frequencies of the pilot signal may be used by being switched. Further, the frequency of the pilot signal used must be adapted to the system involved.

Also, the pilot signal may be used for the timing compensator 69. The phase comparison using the sync signal alone in FIG. 15, for instance, is remarkably improved in accuracy if a pilot signal is used.

In the time axis converter shown in FIG. 7, if the clock signal for A/D 108, and the write clock signal and write address signal of the memory 109 are prepared from the derived pilot signal, and the read clock signal and read address signal for the D/A 110 and memory 109 are prepared from a predetermined reference signal, then application to the time axis converter shown in FIG. 7 to the time axis converters 77 to 82 of FIG. 11 eliminates the need of the timing compensator 69 and TBC (time base converter) at the same time.

Instead of the (R-Y) signal and (B-Y) signal used as color difference signal in the embodiments explained above, a combination I and Q signals or a combination V and U signal may of course be used with equal effect.

What is claimed is:

1. A component video signal magnetic recording and reproducing apparatus comprising:
    for a recording part
        a signal divider for dividing a luminance signal and a pair of color difference signals into two groups of respective signals, each of said groups of respective signals being generated at the output of said divider during alternate horizontal scan periods;
        a first time axis processor for expanding the time axis of said divided luminance signals, compressing the time axis of the divided color difference signals, and multiplexing the time axis expanded luminance signals and the time axis compressed color difference signals to produce two multiplexed signals having durations of two horizontal scan periods respectively; and
        means for processing the two multiplexed signals for recording on different tracks; and
    for a reproducing part
        means for reproducing the multiplexed signals from said tracks;
        a timing compensator for compensating for a timing difference between said two reproduced multiplexed signals, the outputs of said timing compensator being luminance and color difference signal components;
        a second time axis processor for compressing the time axis of the luminance signal component of the multiplexed signals from said timing compensator to recover the divided luminance signals and expanding the time axis of the color difference signal components of the multiplexed signals from said timing compensator to recover the color difference signals; and
        means for producing a continuous luminance signal and a pair of continuous color difference signals by combining the recovered respective signals from said second time axis processor.

2. An apparatus according to claim 1, wherein said recording part further includes a pilot signal generator for generating a pilot signal, said luminance signal expanded along the time axis, said color difference signal compressed along the time axis and said pilot signal being multiplexed to produce said multiplexed signals having durations of two horizontal scan periods; and wherein said reproducing part includes a pilot signal separator for separating the pilot signal from the reproduced multiplexed signals to produce a clock signal for driving said second time axis processor.

3. An apparatus according to claim 2, wherein said first time axis processor includes
first and second sets of time axis converters, each of said first and second sets of time axis converters having a first converter for expanding the time axis of said divided luminance signal and second and third converters for compressing the time axis of said divided color difference signals;
first and second multiplexers, said first multiplexer multiplexing the output of said first set of three time axis converters and said second multiplexer multiplexing the output of said second set of three time axis converters; and
first controller means for controlling said first and second sets of time axis converters; and
said second time axis processor includes
first and second demultiplexers for demultiplexing the output signals from said timing compensator, said first demultiplexer demultiplexing the luminance signal component and said second demultiplexer demultiplexing the color difference signal components;
third and fourth sets of time axis converters, each of said third and fourth sets of time axis converters having a first converter for compressing the time axis of the luminance signal and second and third converters for expanding the time axis of said color difference signals; and
second controller means for controlling said first and second demultiplexers and said third and fourth sets of time axis converters.

4. An apparatus according to claim 1, wherein said first time axis processor includes
first and second sets of time axis converters, each of said first and second sets of time axis converters having a first converter for expanding the time axis of said divided luminance signal and second and third converters for compressing the time axis of said divided color difference signals;
first and second multiplexers, said first multiplexer multiplexing the output of said first set of three time axis converters and said second multiplexer multiplexing the output of said second set of three time axis converters; and
first controlller means for controlling said first and second sets of time axis converters; and
said second time axis processor includes
first and second demultiplexers for demultiplexing the output signals from said timing compensator, said first demultiplexer demultiplexing the luminance signal component and said second demultiplexer demultiplexing the color differnece signal components;
third and fourth sets of time axis converters, each of said third and fourth sets of time axis converters having a first converter for compressing the time axis of the luminance signal and second and third converters for expanding the time axis of said color difference signals; and
second controller means for controlling said first and second demultiplexers and said third and fourth sets of time axis converters.

5. An apparatus according to claim 1, wherein said timing compensator includes
a fixed delay line for delaying one of said two multiplexed signals for a predetermined duration;
a variable delay line for delaying the other of said multiplexed signals;
a first sync signal separator for separating a sync signal from the output of said fixed delay line;
a first sync signal composer for supplementing the output of said first sync signal separator with an equivalent sync signal;
a second sync separator for separating a sync signal from the output of said variable delay line;
a second sync signal composer for supplementing the output of said second sync signal separator with an equivalent sync signal;
a phase comparator for detecting the phase difference between the outputs of said first and second sync signal composers and controlling the delay time of said variable delay line according to said phase difference, and which apparatus further includes
two playback processors connected to the inputs of said fixed delay line and said variable delay line respectively, the outputs of said fixed delay line and said variable delay line being applied to said second time axis processor.

6. An apparatus according to claim 2, wherein said first time axis processor includes a first controller for producing a sync signal and a continuous wave signal, and wherein said pilot signal generator comprises a gate pulse generator for receiving said sync signal and generating a gate pulse; a frequency divider for receiving said continuous wave signal and generating a divided signal; and gate means controlled by said gate pulse for gating the output of said frequency divider thereby generating said pilot signal.

7. An apparatus according to claim 2, wherein said timing compensator includes
a fixed delay line for delaying one of said two multiplexed signals for a predetermined duration;
a variable delay line for delaying the other of said multiplexed signals;
a first sync signal separator for separating a sync signal from the output of said fixed delay line;
a first sync signal composer for supplementing the output of said first sync signal separator with an equivalent sync signal;
a second sync separator for separating a sync signal from the output of sid variable delay line;
a second sync signal composer for supplementing the output of said second sync signal separator with an equivalent sync signal;
a phase comparator for detecting the phase difference between the outputs of said first and second sync signal composers and controlling the delay time of said variable delay line according to said phase difference; and which apparatus further includes
two playback processors connected to the inputs of said fixed delay line and said variable delay line respectively, the outputs of said fixed delay line and said variable delay line being applied to said second time axis processor.

* * * * *